US012633026B2

(12) United States Patent
Huang

(10) Patent No.: US 12,633,026 B2
(45) Date of Patent: May 19, 2026

(54) IMAGE PROCESSING METHOD AND APPARATUS, ELECTRONIC DEVICE AND READABLE STORAGE MEDIUM

(71) Applicant: Beijing Zitiao Network Technology Co., Ltd., Beijing (CN)

(72) Inventor: Shanyue Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 263 days.

(21) Appl. No.: 18/552,021

(22) PCT Filed: Mar. 21, 2022

(86) PCT No.: PCT/CN2022/082097
§ 371 (c)(1),
(2) Date: Sep. 22, 2023

(87) PCT Pub. No.: WO2022/227937
PCT Pub. Date: Nov. 3, 2022

(65) Prior Publication Data
US 2024/0212250 A1       Jun. 27, 2024

(30) Foreign Application Priority Data

Apr. 29, 2021    (CN) .......................... 202110476290.7

(51) Int. Cl.
*G06T 13/40*          (2011.01)
*G06T 5/70*           (2024.01)
(Continued)

(52) U.S. Cl.
CPC ................ *G06T 13/40* (2013.01); *G06T 5/70* (2024.01); *G06T 7/11* (2017.01); *G06T 7/70* (2017.01);
(Continued)

(58) Field of Classification Search
None
See application file for complete search history.

(56) References Cited

U.S. PATENT DOCUMENTS 10,839,586 B1    11/2020  Nemchinov et al.
2011/0113361 A1*   5/2011  Bhatt ................... H04N 1/0044
                                                345/643
(Continued)

FOREIGN PATENT DOCUMENTS

CN          107294838  A      10/2017
CN          107728782  A       2/2018
(Continued)

OTHER PUBLICATIONS

Tang, Y. et al., "Research and implementation of VC-based digital image processing," China National Knowledge Infrastructure, Available Online at https://kns.cnki.net/kcms2/article/abstract?v=3uoqlh G8C44YLTIOAiTRKgchrJ08w1e7xAZywCwkEELHbJVOWYMr 1c9mTpSY1UBw9KXhadK7fAgEmWKPsdAV5KMbGkLaqxif&u niplatform=NZKPT, Mar. 15, 2013, 3 pages (submitted with English abstract).
(Continued)

*Primary Examiner* — Peter Hoang
(74) *Attorney, Agent, or Firm* — Alleman Hall LLP

(57)                ABSTRACT

Embodiments of the present disclosure provide an image processing method and apparatus, an electronic device, and a readable storage medium. The method includes: acquiring an image; detecting a target object in the image; performing, based on a posture of the target object, dancing effect rendering on the target object to generate an animation of the target object dancing; superimposing the animation on the image to obtain a dancing effect animation; and displaying the dancing effect animation. In the embodiment of the present disclosure, the object in the image can be rendered (Continued)

with a dancing effect to generate the animation of the object dancing.

19 Claims, 7 Drawing Sheets

(51) Int. Cl.

| | |
|---|---|
| *G06T 7/11* | (2017.01) |
| *G06T 7/70* | (2017.01) |
| *G06T 13/80* | (2011.01) |
| *G06V 10/20* | (2022.01) |

(52) U.S. Cl.
CPC ............ *G06T 13/80* (2013.01); *G06V 10/255* (2022.01); *G06T 2207/10016* (2013.01); *G06T 2207/30196* (2013.01); *G06V 2201/07* (2022.01)

(56) References Cited

U.S. PATENT DOCUMENTS

| | | | | |
|---|---|---|---|---|
| 2015/0084991 | A1* | 3/2015 | Schutz ...................... | G06T 5/50 345/647 |
| 2015/0187139 | A1* | 7/2015 | Ahn ........................ | G06T 11/00 345/633 |
| 2017/0103664 | A1* | 4/2017 | Wong ...................... | G09B 5/065 |
| 2018/0214777 | A1 | 8/2018 | Hingorani | |
| 2021/0029305 | A1* | 1/2021 | Tang ................... | H04N 23/633 |
| 2021/0110700 | A1* | 4/2021 | Harman ................. | G06N 20/00 |

FOREIGN PATENT DOCUMENTS

| | | | |
|---|---|---|---|
| CN | 108564643 | A | 9/2018 |
| CN | 108711192 | A | 10/2018 |
| CN | 109525891 | A | 3/2019 |
| CN | 109803165 | A | 5/2019 |
| CN | 106341720 | B | 7/2019 |
| CN | 111402373 | A | 7/2020 |
| CN | 111540055 | A | 8/2020 |
| CN | 111627117 | A | 9/2020 |
| CN | 111640192 | A | 9/2020 |
| CN | 111640197 | A | 9/2020 |
| CN | 111757175 | A | 10/2020 |
| CN | 111953906 | A | 11/2020 |
| CN | 112396676 | A | 2/2021 |
| CN | 112544070 | A | 3/2021 |
| WO | 2008087621 | A1 | 7/2008 |
| WO | 2020107904 | A1 | 6/2020 |

OTHER PUBLICATIONS

ISA China National Intellectual Property Administration, International Search Report and Written Opinion Issued in Application No. PCT/CN2022/082097, May 5, 2022, WIPO, 13 pages.
China National Intellectual Property Administration, Office Action and Search Report Issued in Application No. 202110476290.7, Sep. 1, 2023, 11 pages (submitted with partial English translation).
China National Intellectual Property Administration, Notice of Allowance issued in Chinese Application No. 202110476290.7, Jan. 24, 2024, 7 pages. (Submitted with partial English translation).

* cited by examiner

800

IMAGE PROCESSING METHOD AND APPARATUS, ELECTRONIC DEVICE AND READABLE STORAGE MEDIUM

CROSS-REFERENCE TO RELATED APPLICATIONS

This application is a National Stage of International Application No. PCT/CN2022/082097, filed on Mar. 21, 2022, which claims the priority of Chinese Patent Application No. 202110476290.7, titled "IMAGE PROCESSING METHOD AND APPARATUS, ELECTRONIC DEVICE AND READABLE STORAGE MEDIUM" filed on Apr. 29, 2021. The entire contents of the above applications are incorporated into this application by reference in their entireties.

TECHNICAL FIELD

The embodiments of the present disclosure relate to the field of image processing technologies, and in particular, to an image processing method and apparatus, an electronic device, and a readable storage medium.

BACKGROUND

With the development of video technologies, video has become an important way for a user to get information. More and more users are used to recording and sharing their lives by taking photos and recording videos.

At present, applications for recording video involve various ways of image processing, and users may render images and videos by using various ways of image processing methods to make the images and videos more interesting.

However, the current ways of image processing are simple and have poor flexibility.

SUMMARY

Embodiments of the present disclosure provides an image processing method and apparatus, an electronic device, and a readable storage medium, which enrich the processing ways of image processing, and can improve flexibility.

In a first aspect, an embodiment of the present disclosure provides an image processing method, including: acquiring an image; detecting a target object in the image; performing, based on a posture of the target object, dancing effect rendering on the target object to generate an animation of the target object dancing; superimposing the animation on the image to obtain a dancing effect animation; and displaying the dancing effect animation.

In the embodiment of the present disclosure, the object in the image can be rendered with a dancing effect to generate the animation of the object dancing, which enriches the ways of image processing and increases flexibility. In the embodiment of the present disclosure, the animation of the target object dancing superimposed on the image can be displayed, which increases playfulness.

In a second aspect, an embodiment of the present disclosure provides an image processing apparatus, including:

a processing module, configured to acquire an image; detect a target object in the image; perform, based on a posture of the target object, dancing effect rendering on the target object to generate an animation of the target object dancing; and superimpose the animation on the image to obtain a dancing effect animation; and a displaying module, configured to display the dancing effect animation.

In a third aspect, an embodiment of the present disclosure provides an electronic device, including: a processor and a memory;

where the memory stores computer-executable instructions; and the processor executes the computer-executable instructions stored in the memory to cause the processor to execute the image processing method according to the first aspect.

In a fourth aspect, an embodiment of the present disclosure provides a computer-readable storage medium where the computer-readable storage medium has computer-executable instructions stored thereon, and when a processor executes the computer-executable instructions, the image processing method according to the above first aspect and any possible designs of the first aspect is implemented.

In the fifth aspect, an embodiment of the present disclosure provides a computer program product, including a computer program or instructions, where when the computer program or the instructions are executed by a processor, the image processing method according to the above first aspect and any possible designs of the first aspect is implemented.

In a sixth aspect, an embodiment of the present disclosure provides a computer program, where when the computer program is executed by a processor, the image processing method according to the above first aspect and any possible designs of the first aspect is implemented.

Embodiments of the present disclosure provides an image processing method and apparatus, an electronic device, and a readable storage medium. The method includes: acquiring an image; detecting a target object in the image; performing, based on a posture of the target object, dancing effect rendering on the target object to generate an animation of the target object dancing; superimposing the animation on the image to obtain a dancing effect animation; and displaying the dancing effect animation. In the embodiments of the present disclosure, the object in the image can be rendered with the dancing effect to generate the animation of the object dancing, which enriches the ways of image processing and increases flexibility. In the embodiments of the present disclosure, an animation of the target object dancing can be displayed superimposed on the image, which increases playfulness.

BRIEF DESCRIPTION OF DRAWINGS

In order to describe the technical solutions in the embodiments of the present disclosure or prior art more clearly, the following will briefly introduce drawings that need to be used in the description of the embodiments or prior art. Obviously, the drawings described below are some embodiments of the present disclosure, and for those of skilled in the art, other drawings can be obtained based on these drawings without paying creative efforts.

DESCRIPTION OF EMBODIMENTS

Figure 1:
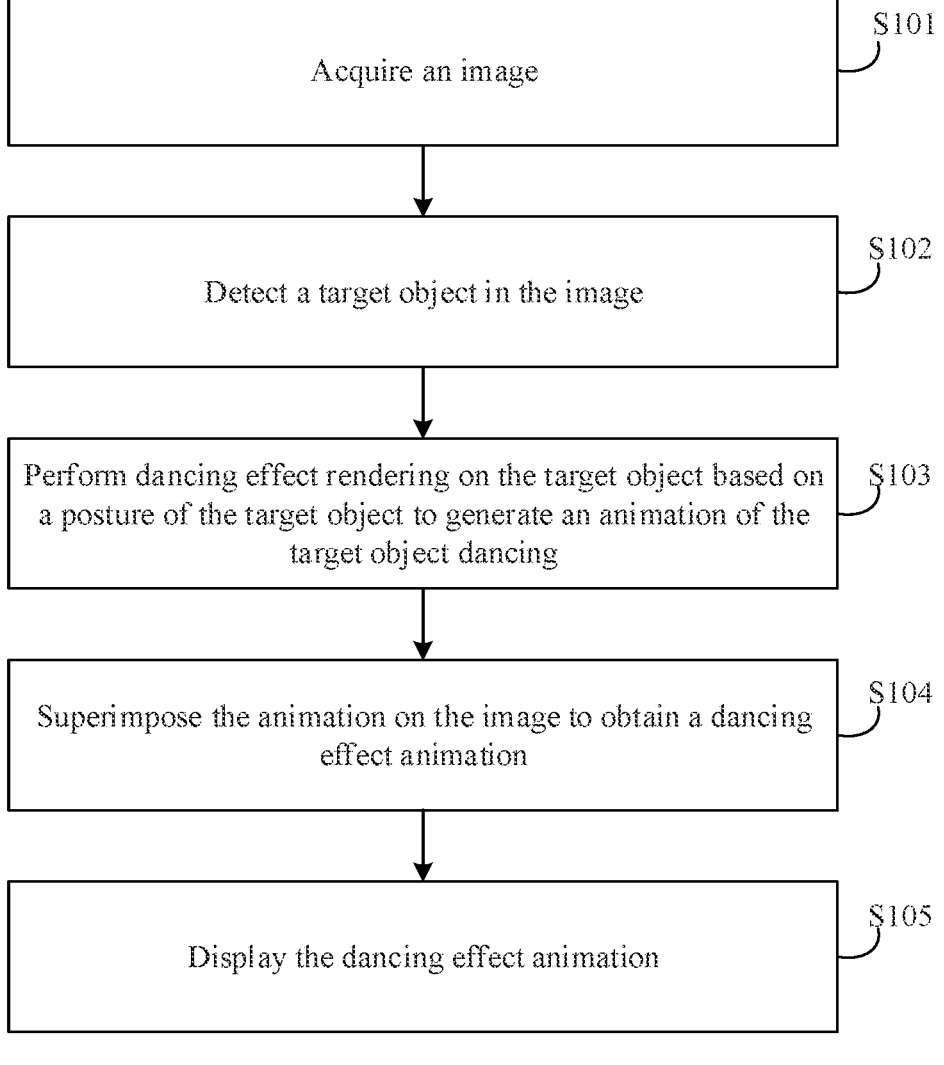
FIG. 1 is a schematic flowchart of an embodiment of an image processing method according to an embodiment of the present disclosure.

In order to make the purpose, technical solutions and advantages of embodiments of the present disclosure clearer, the technical solutions in the embodiments of the present disclosure will be described below clearly and completely in conjunction with accompanying drawings in the embodiments of the present disclosure. Apparently, the described embodiments are a part rather than all of the embodiments of the present disclosure. Based on the embodiments in the present disclosure, all the other embodiments acquired by those skilled in the art without delivering creative efforts shall fall into the protection scope of the present disclosure.

In order to solve the problem that the ways of image processing in the prior art are single and have poor flexibility, an embodiment of the present disclosure provides an image processing method, which can perform dancing effect rendering on the target object in the image to generate an animation of the object dancing, which enriches the ways of image processing, and increases flexibility and playfulness.

It should be understood that the execution subject of the image processing method in the embodiments of the present disclosure may be an image processing apparatus. The image processing apparatus may be a terminal device or a device specifically designed to execute the image processing method. In the following embodiments, the terminal device is taken as the execution subject of executing the image processing method as an example for description.

In an embodiment, the terminal device involved in the present disclosure may be a wireless terminal or a wired terminal. A wireless terminal may be a device that provides voice and/or other business data connectivity to a user, a handheld device with a wireless connection function, or other processing devices connected to a wireless modem. A wireless terminal may communicate with one or more core network devices via a radio access network (RAN). The wireless terminal may be a mobile terminal, such as a cell phone (or "cellular" phone) and a computer with a mobile terminal, for example, a portable, pocket-sized, handheld, computer built-in, or vehicle-mounted mobile device, that exchanges language and/or data with the radio access network. For another example, the wireless terminal may also be a personal communication service (PCS) terminal, a cordless phone, a session initiation protocol (SIP) phone, a wireless local loop (Wireless Local Loop, WLL for short) station, a personal digital assistant PDA) or other devices. The wireless terminal may also be called a system, a subscriber unit, a subscriber station, a mobile station, a mobile, a remote station, a remote terminal, an access terminal, a user terminal, a user agent, and a user device or a user equipment, which are not limited here. In an implementation, the above-mentioned terminal device may also be a device such as a tablet computer, a wearable electronic device, or a smart home device. The terminal device is not specifically limited in the embodiment of the present disclosure.

The image processing method provided in the embodiments of the present disclosure will be described below with reference to specific embodiments. The following embodiments may be combined with each other, and the same or similar concepts or processes may not be repeated in some embodiments. FIG. 1 is a schematic flowchart of an embodiment of an image processing method according to an embodiment of the present disclosure. Referring to FIG. 1, the image processing method may include:

S101, acquire an image.

The image may be an image stored locally on the terminal device, or a frame of image in a video being captured by the terminal device, or a frame of image in a local video of the terminal device, or the image may also be an image uploaded to the terminal device. The image is not specifically limited in the embodiment of the present disclosure.

Figure 2:
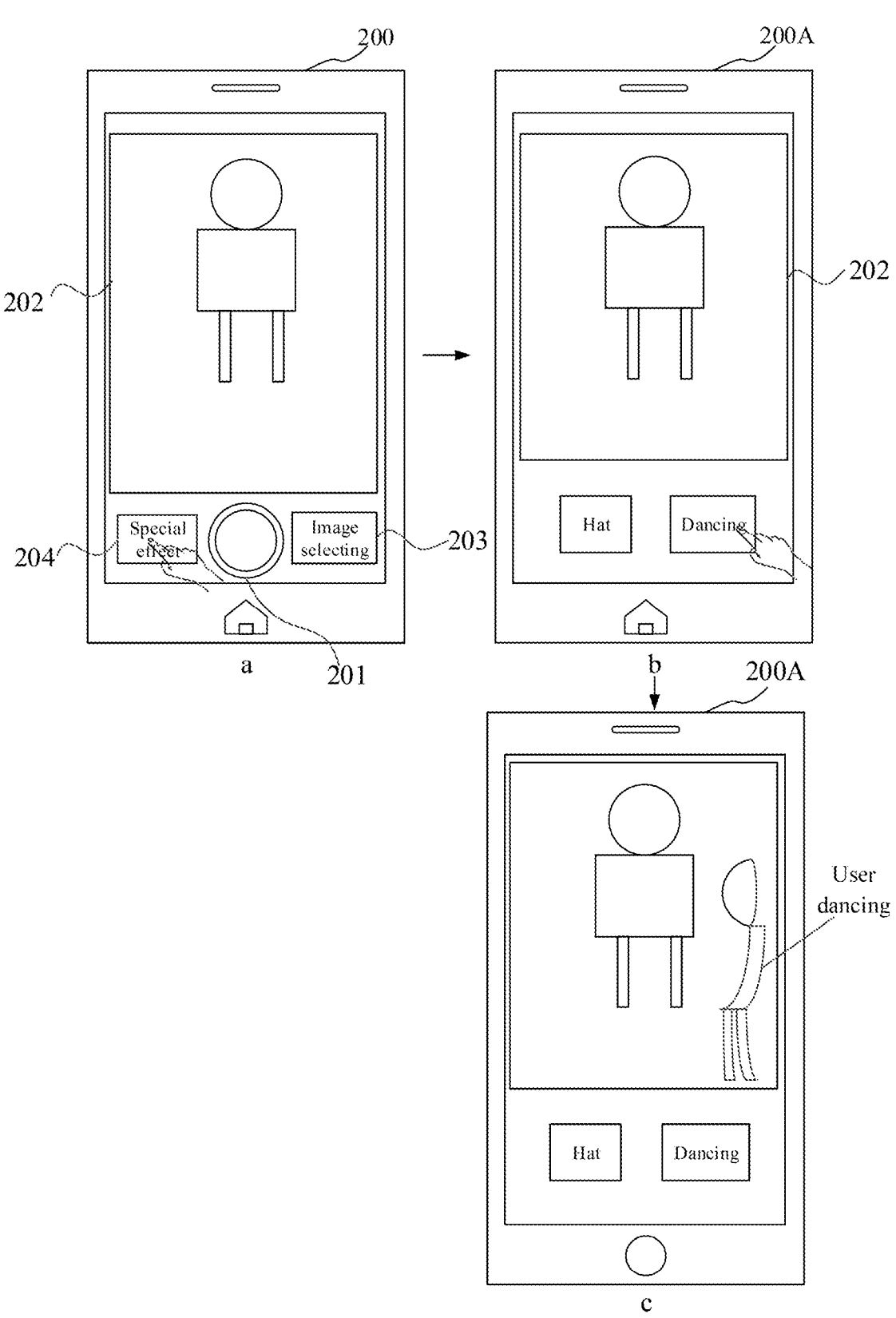
FIG. 2 is a schematic diagram of a scenario to which an embodiment of the present disclosure is applicable.

FIG. 2 is a schematic diagram of a scenario to which an embodiment of the present disclosure is applicable. Referring to a in FIG. 2, a user opens an application for image processing on a terminal device, and an interface 200 of the terminal device can display a capturing control 201, a capturing preview frame 202, an image selecting control 203, and a special effect control 204. The user selects the capturing control 201, which is used to instruct the terminal device to capture an image or a video. The capturing preview frame 202 displays a video picture captured by the terminal device. The image selecting control 203 is used to prompt the user to select an image locally stored in the terminal device. The special effect control 204 is used to provide an identification of at least one special effect tool, and identifications of different special effect tools may be used to represent different special effect tools.

After the user selects the special effect control 204, the interface 200 may jump to the interface 200A, and the interface 200A may display, for example, the identification of at least one special effect tool and the capturing preview frame 202. In an embodiment, in order to adapt to a layout of the identification of at least one special effect tool, the terminal device will adaptively adjust a size of the capturing preview frame 202. Illustratively, referring to b in FIG. 2, the interface 200A may display a plurality of picture identifications of special effect tools, for example, a picture identification of "hat", a picture identification of "dancing" and so on. It should be understood that, the picture identification of "hat" and the picture identification of "dancing" are represented by text in b of FIG. 2. The picture identification of "hat" can be used to prompt to add a special effect of wearing a hat to the target object in the image, and the picture identification of "dancing" is used to prompt to perform dancing effect rendering on the object in the image, that is, the dancing effect rendering provided by the embodiment of the present disclosure, which can refer to the following related descriptions for details. Here, an example scenario in which a user triggers a terminal device to process an image is introduced.

In an embodiment, the user may select the special effect control 204 to select the picture identification of "dancing" to trigger the terminal device to perform dancing effect rendering on the image. After the user selects the picture identification of "dancing", the user can select the image, or the terminal device can capture the image, to make the terminal device acquire the image. In an embodiment, the user can first select the image, or the terminal device can capture the image, and then the user selects the picture identification of "dancing", to make the terminal device acquire the image, and trigger the terminal device to perform dancing effect rendering on the image then. In the embodiment of the present disclosure, how the user triggers the terminal device to perform dancing effect rendering on the image, and whether the terminal device acquires the image first or acquires the image later are not specifically limited.

Figure 3:
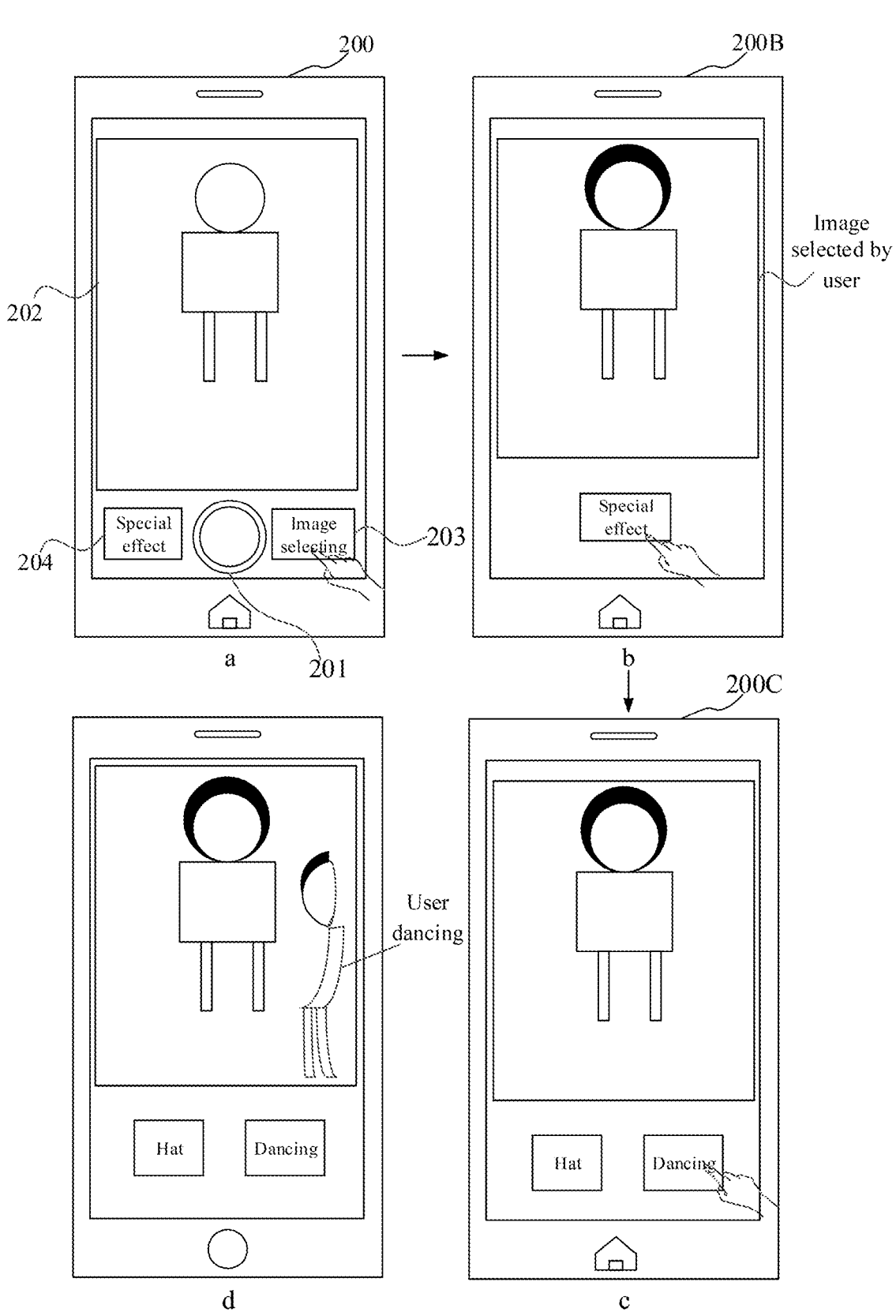
FIG. 3 is a schematic diagram of an interface according to an embodiment of the present disclosure.

In FIG. 3, it is taken as an example for illustration that the user acquires the image first, and then selects the picture identification of "dancing". Referring to a in FIG. 3, the user selects the image selecting control 203 on the interface 200, which may trigger the user to select an image in a local photo album of the terminal device. It should be understood that the process of selecting an image by the user is omitted in FIG. 3. Referring to the interface 200B of b in FIG. 3, the image that has been selected by the user to be processed and the special effect control 204 are displayed on the interface 200B.

The user can select the special effect control 204, and the terminal device may jump to the interface 200C. Referring to c in FIG. 3, the interface 200C displays the identification of at least one special effect tool. For the identification of the special effect tool, reference can be made to the relevant description above. On the interface 200C, the user selects the picture identification of "dancing", which can trigger the terminal device to perform the following image processing method according to the embodiment of the present disclosure, for example, the processing in S102-S104, referring to the following related description.

In addition, in an embodiment, the user can also first select the special effect control 204 (as shown on the interface 200B), and accordingly, the terminal device may jump to the interface 200C. Referring to c in FIG. 3, the interface 200C displays the identification of at least one special effect tool. For the identification of the special effect tool, reference can be made to the relevant description above. On the interface 200C, after selecting the picture identification of "dancing", the user can select a corresponding image, which can trigger the terminal device to perform the following image processing method according to the embodiment of the present disclosure, for example, the processing in S102-S104, referring to the following related description. S102, detect a target object in the image.

The target object includes a target object in the image, including but not limited to an animal, a human body, an item, etc. in the image. The item may be a table, a chair, a building, a plant, etc. It should be understood that the human body may include a user's head and/or body. The target object may be preset. In the following embodiment, the human body is taken as the target object as an example for illustration. Illustratively, as shown in b in FIG. 3 above, the terminal device may detect that the target object is a human body.

As described in S101 above, the terminal device may acquire an image, and detect a target object in the image. In an embodiment, the terminal device may use an image segmentation algorithm to detect the target object in the image. The image segmentation algorithm may be, but not limited to: an image semantic segmentation algorithm, an edge detection algorithm.

S103, perform dancing effect rendering on the target object based on a posture of the target object to generate an animation of the target object dancing.

The posture of the target object may be standing, half squatting, sitting, etc. In the embodiment of the present disclosure, the terminal device may perform dancing effect rendering on the target object based on the posture of the target object, to generate an animation of the target object dancing.

Figure 4:
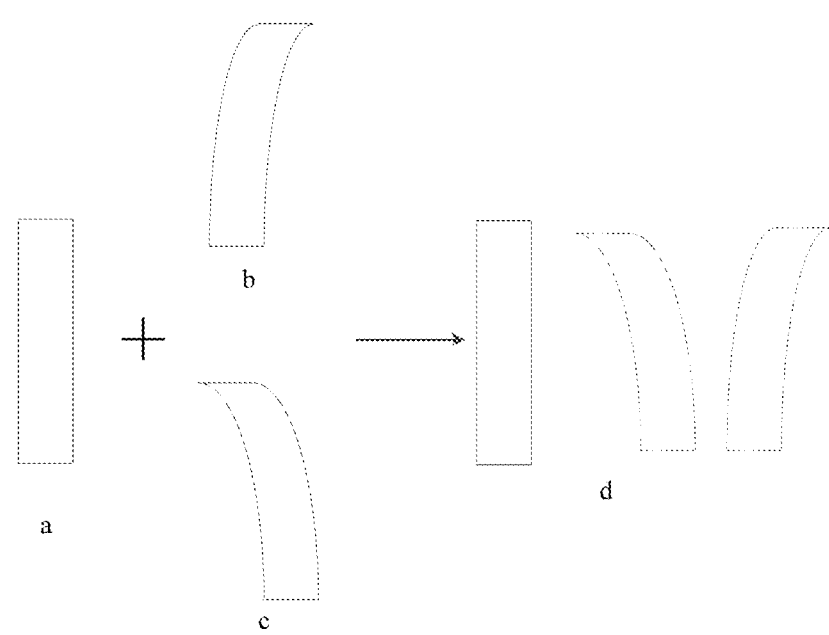
FIG. 4 is a schematic diagram of a type of dancing effect rendering according to an embodiment of the present disclosure.

In an embodiment, the dancing effect rendering can be understood as generating an animation of the target object dancing without changing the posture of the target object. Illustratively, the animation of the target object dancing may be an animation of the target object dancing, for example, with an "S" bend. In FIG. 4, a rectangle is taken as an example to represent the human body to illustrate the dancing effect rendering. Referring to a in FIG. 4, the posture of the human body detected by the terminal device is "standing". A vertical rectangle represents "standing" as shown in a in FIG. 4. The terminal device performs dancing effect rendering on the human body, to make the human body present an animation of dancing with an "S" bend, as shown in b and c in FIG. 4. Distorted rectangles represent the dancing human body as shown in b and c in FIG. 4.

S104, superimpose the animation on the image to obtain a dancing effect animation.

After the terminal device acquires the animation of the target object dancing, it can superimpose the animation of the target object dancing on the image, to obtain the dancing effect animation.

Illustratively, as shown in d in FIG. 4, the image is a "standing" human body, and the animation of the target object dancing is an animation of the human body dancing with an "S" bend. It should be understood that in FIG. 4, the animation of the human body dancing is represented by a distorted rectangle in a dotted line, and what is shown in d in FIG. 4 is the dancing effect animation.

S105, display the dancing effect animation.

In the embodiment of the present disclosure, after the terminal device obtains the dancing effect animation, it can display the dancing effect animation, and the user can see a result of the dancing effect rendering of the image on the interface of the terminal device.

Illustratively, after the terminal device performs dancing effect rendering on the target object in the image selected by the user, it may display the dancing effect animation shown in d of FIG. 3. It should be understood that in d of FIG. 3, the animation of a user dancing is represented by a wriggling user, and a frame of image in the animation of the user dancing is illustratively shown in d of FIG. 3.

The image processing method according to the embodiment of the present disclosure includes: acquiring an image; detecting a target object in the image; performing, based on a posture of the target object, dancing effect rendering on the target object to generate an animation of the target object dancing; superimposing the animation on the image to obtain a dancing effect animation; and displaying the dancing effect animation. In the embodiment of the present disclosure, the object in the image can be rendered with a dancing effect to generate the animation of the object dancing, which enriches the ways of image processing and increases flexibility. In the embodiment of the present disclosure, the animation of the target object dancing can be displayed superimposed on the image, which increases playfulness.

In an embodiment, since a video includes multiple frames of images, the image processing method according to the embodiment of the present disclosure may be applied in a scenario where dancing rendering is performed on the images in the video. The image processing method according to the embodiment of the present disclosure will be described below by taking a frame of image as the image as an example.

Figure 5:
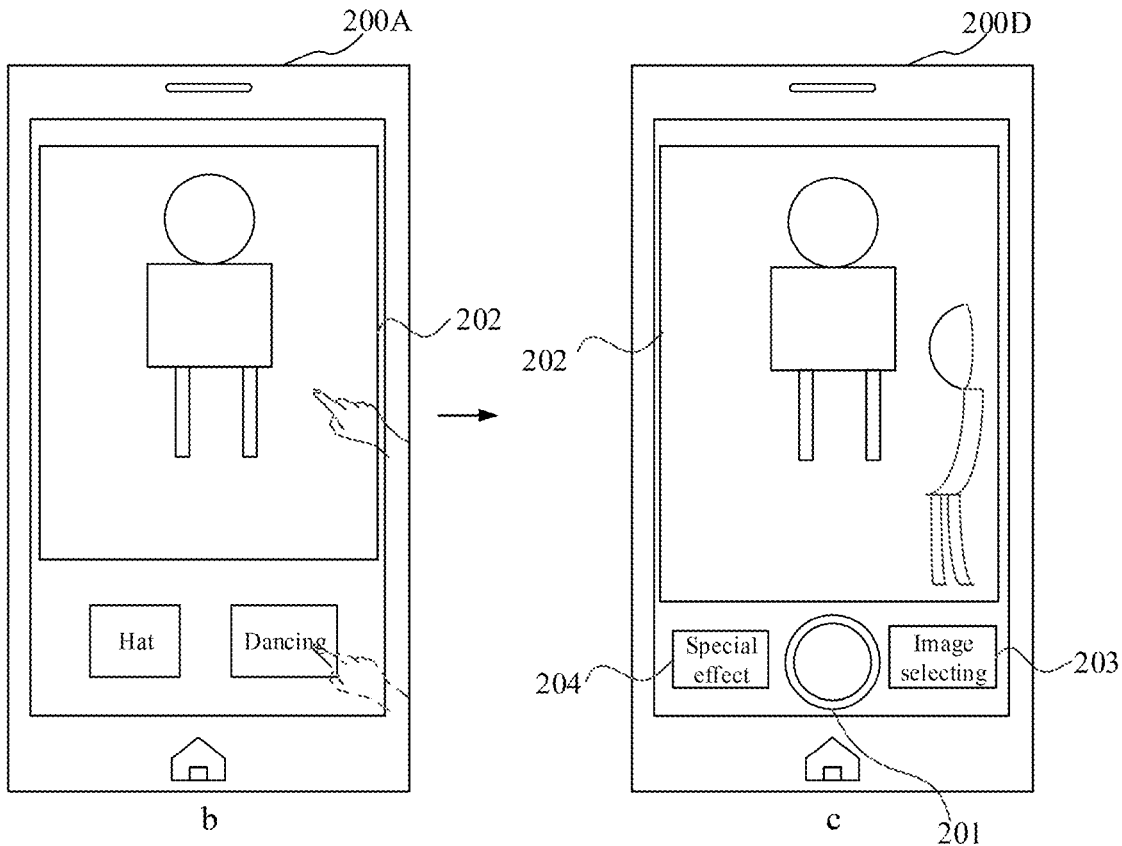
FIG. 5 is a schematic diagram of another interface according to an embodiment of the present disclosure.

Illustratively, as shown in b in FIG. 5, after the user selects the picture identification of "dancing", the user clicks the capturing preview frame 202, and the interface 200A can jump to the interface 200D. Referring to c in FIG. 5, the interface 200D displays a capturing control 201, a capturing preview frame 202, an image selecting control 203, and a special effect control 204, for which reference can be made to the relevant description above.

Different from the capturing preview frame 202 in a in FIG. 2 above, the capturing preview frame 202 in c in FIG. 5 can display the dancing effect animation of the user. A specific implementation in which the terminal device can display the dancing effect animation of the user in the capturing preview frame 202 can be that: the terminal device detects the target object in an image of the captured video picture (referred to as video), where the terminal device can detect the target object in a first frame of image of the video. It should be understood that the image in the embodiment of the present disclosure may be a frame of image in the video, the frame of image may be a frame of image in which the target object is detected by the terminal device, and the frame of image in which the target object is detected may be the first frame of image of the video, or the N-th frame of image of the video, where N can be an integer greater than 1. It should be understood that for b in FIG. 5 reference may be made to the relevant description of the b in FIG. 2, a is not shown in FIG. 5, and an interface shown in a in FIG. 2 can be displayed before the b in FIG. 5.

In an embodiment, the user can select the capturing control 201 to trigger the terminal device to start capturing video, and then the terminal device can detect the target object in the image of the video captured by the terminal device, to perform the steps of S102-S105 in the above-mentioned embodiment, and then display the dancing effect animation in the video.

In an embodiment, referring to b in FIG. 2, the user selects the picture identification of "dancing" in the interface 200A, and the terminal device can display the dancing effect animation of the user in the capturing preview frame 202, as shown in c in FIG. 2 or shown in c in FIG. 5. It should be understood that when the terminal device detects that the user selects the picture identification of "dancing", the terminal device can acquire the video picture (referred to as video for short) captured by the terminal device, and then execute the steps of S102-S105 in the above-mentioned embodiment, and then display the dancing effect animation in the video.

Figure 6:
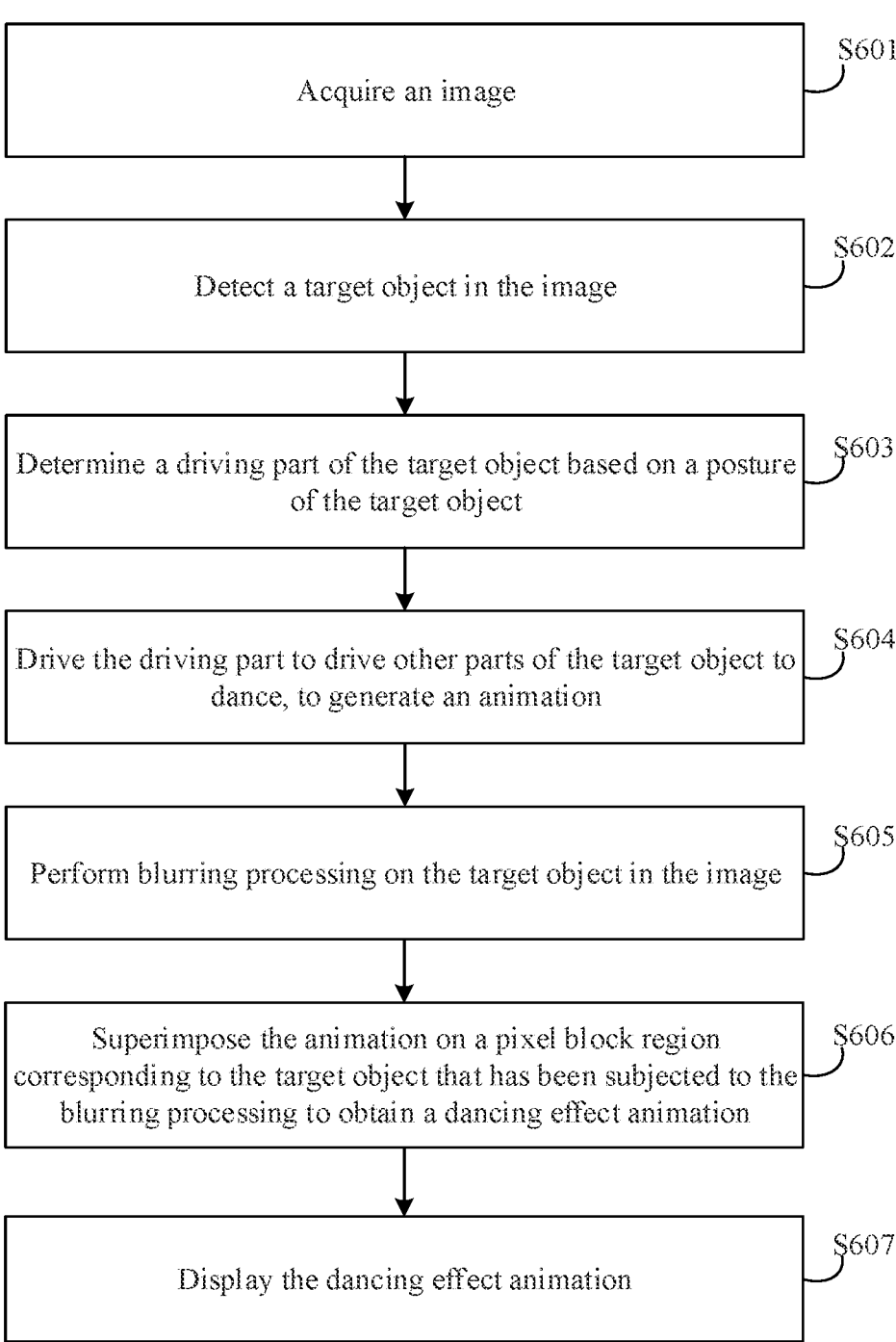
FIG. 6 is a schematic flowchart of another embodiment of an image processing method according to an embodiment of the present disclosure.

The image processing method according to the embodiment of the present disclosure will be described below based on FIG. 2, FIG. 5, and FIG. 6. Referring to FIG. 6, the image processing method according to the embodiment of the present disclosure may include:

S601, acquire an image.

For S601, reference may be made to the relevant description of S101 above. In an embodiment, since the embodiment of the present disclosure is described by taking an image to be a frame of image in a video as an example, reference may be made to the related technology of FIG. 5 for the terminal device acquiring the image. The image may be a frame of image in the video. The frame of image may be a frame of image in which the target object is detected by the terminal device. The frame of image in which the target object is detected may be the first frame of image of the video, or the N-th frame of image of the video, where N can be an integer greater than 1. The present disclosure does not limit a starting frame for detecting the target object, which can be set according to actual application needs.

S602, detect a target object in the image.

For the method by which the terminal device detects the target object in the image, reference may be made to the relevant description of S102 above.

Figure 7:
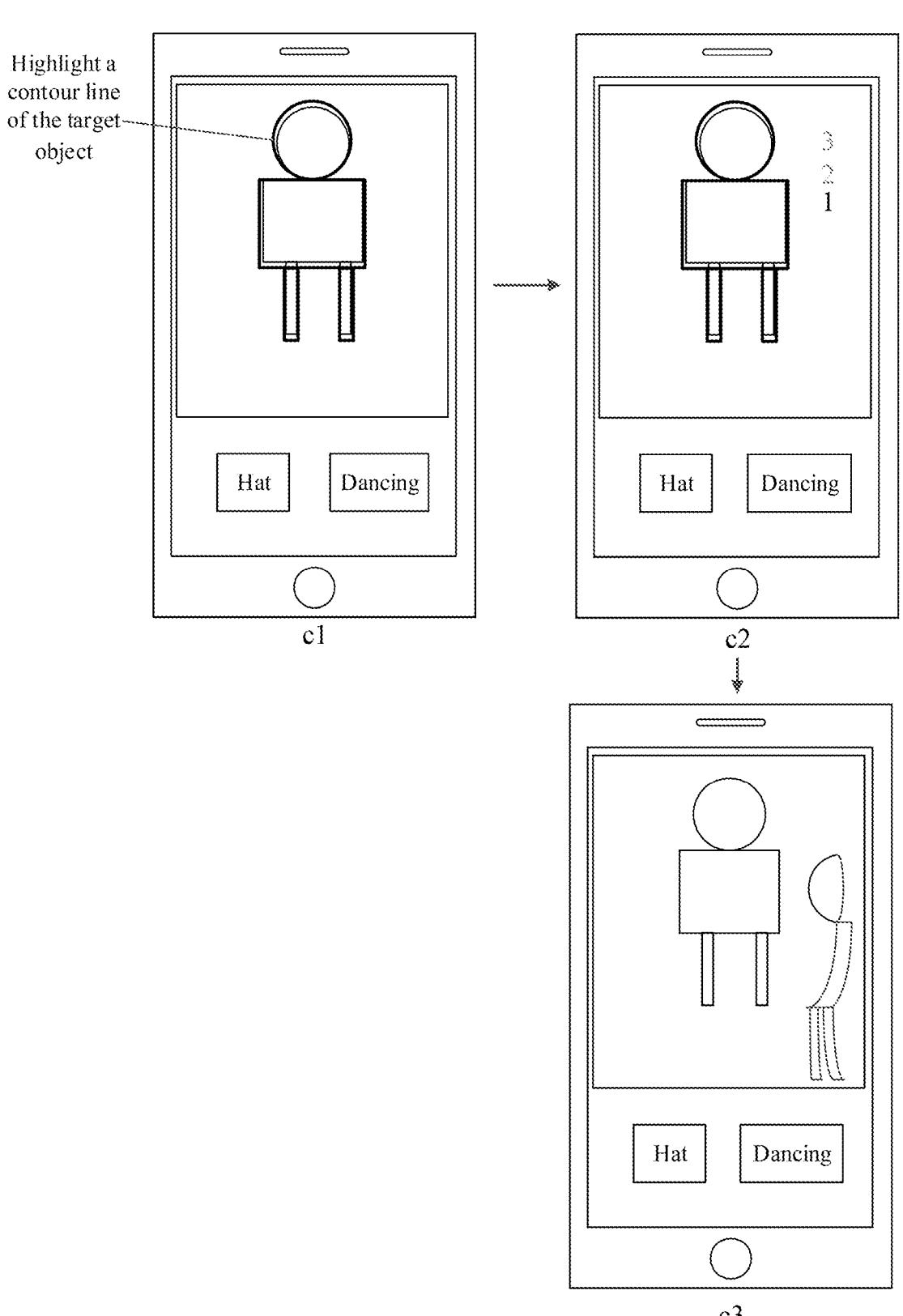
FIG. 7 is a schematic diagram of another interface according to an embodiment of the present disclosure.

Illustratively, c in FIG. 2 may be replaced by c1-c3 in FIG. 7. When the user selects the picture identification of "dancing" in the interface 200A, referring to c1 in FIG. 7, the terminal device can detect the target object in the image of the captured video. In order to prompt the user that the terminal device has detected the target object, the terminal device may display an identification on the image to mark the target object.

In an embodiment, the method for the terminal device to display the identification on the image may include: displaying an arrow pointing to an object above the object to indicate that the object is the target object in the image; or performing, by the terminal device, blurring processing on a region other than the target object in the image; or highlighting, by the terminal device, a contour line of the target object in the image. The method for the terminal device to display the identification on the image is not limited in the embodiment of the present disclosure, as long as the user can be prompted that the terminal device detects the target object.

Illustratively, as shown in c1 in FIG. 7, the terminal device highlighting the contour line of the target object in the image is taken as an example, which represents that the terminal device displays the identification on the image. In this way, the user can see the target object detected by the terminal device on the terminal device.

In an embodiment, the terminal device may detect a candidate object in the image, and then determine the target object from the candidate object. If there is one candidate object, the candidate object may be determined as the target object.

If there are at least two candidate objects, in an embodiment, the terminal device may determine the at least two candidate objects as the target objects. In an embodiment, the terminal device may determine a candidate target object from the at least two candidate objects, and then determine the candidate target object as the target object. In this embodiment, the candidate target object may include: a candidate object with a largest area ratio among the at least two candidate objects, or the candidate target object may include: a candidate object at a preset position on an interface of the terminal device.

Illustratively, taking a human body as the target object as an example for illustration, the terminal device may detect human bodies (that is, candidate objects) in an image, and then determine the target object from the candidate objects. If the terminal device detects that the image includes one human body, the human body may be determined as the target object.

If the terminal device detects that at least two human bodies (that is, at least two candidate objects) are included in the image, in an embodiment, the terminal device may determine the at least two human bodies as the target objects. That is, the terminal device performs dancing effect rendering on each of the human bodies. In an embodiment, the terminal device may acquire a target human body (that is, a candidate target object) from the at least two human bodies, and then determine the target human body as the target object to perform dancing effect rendering on the target human body.

In an embodiment, the terminal device may acquire an area ratio of each candidate object of the at least two human bodies. The area ratio of each human body may refer to a ratio of the area of each human body to the area of the image. It should be understood that, since the terminal device can detect each human body in the image, the terminal device can acquire the area ratio of each human body. It should be noted that the terminal device may use an image segmentation algorithm to detect each human body in the image. When the terminal device acquires the area ratio of each human body of the at least two human bodies, the human body with the largest area ratio may be determined as the target human body.

In an embodiment, the terminal device may preset a preset position. For example, the preset position is a central area of an interface of the terminal device. The terminal device may determine a human body at the preset position as a target human body. In an embodiment, the terminal device may also display an object selecting frame in the central area of the interface, so that the terminal device can determine a candidate object located in the object selecting frame (that is, at the preset position) as the candidate target object.

In an embodiment, the terminal device may determine the target human body by combining the above two methods for acquiring the target human body. Illustratively, when the preset position includes at least two human bodies, the terminal device may determine the human body with the largest area ratio at the preset position as the target human body. It should be understood that, when the terminal device detects the target human body (that is, the target object), the identification of the target object may be displayed on the image, to prompt the user that the target object is detected.

In an embodiment, when the terminal device detects the target object, a countdown may be displayed on the captured video by the terminal device, where the countdown is used to prompt that dancing effect rendering will be performed on the image at the end of the countdown. Illustratively, referring to c2 in FIG. 7, a countdown picture, such as "3", "2" and "1" may be displayed on the interface of the terminal device. It should be understood that in c2 in FIG. 7, a light gray 3 and a light gray 2 represent that the countdown of "3" and "2" has been completed, and a black 1 represents that the countdown is "1" at present.

In an embodiment, S103 may be replaced with S603 and S604.

S603, determine a driving part of the target object based on a posture of the target object.

In the image, the target object includes a plurality of pixel blocks, and the driving part may include a part with a smallest ordinate among the pixel blocks of the target object. Illustratively, if the posture of the target object is standing, the driving part of the target object may be a foot of the target object. If the posture of the target object is kneeling, the driving part of the target object may be a knee of the target object.

In an embodiment, the terminal device may execute an image-to-3D mesh algorithm once, to acquire a three-dimensional (three dimensions, 3D) target object based on a two-dimensional (two dimensions, 2D) target object in the image. It should be understood that, the image-to-mesh algorithm is used to estimate coordinates of vertices of a 3D mesh, to obtain a three-dimensional human body, and then obtain three-dimensional human body joints. For the image-to-mesh algorithm, reference may be made to relevant descriptions in the prior art, which will not be repeated here.

After acquiring the three-dimensional human joints, the terminal device can use an algorithm of binding a human skeleton and adding weights to obtain the driving part of the target object. It should be understood that, a target object including a human body is taken as an example for illustration. The human body includes multiple bones. By binding the human skeleton, the bones in the human body can be acquired. When the human body is moving, there is a linkage between the bones. For example, one bone will drive the movement of other bones. The weight in the embodiment of the present application represents a control right of a bone to each bone that can be driven. Illustratively, the terminal device can use a blender algorithm of quickly binding a human skeleton model and adding weights, to bind the human skeleton and add weights, or the terminal device can use 3dmax or Spine to bind the human skeleton and add weights.

S604, driving the driving part to drive other parts of the target object to dance, to generate the animation.

After acquiring the driving part of the target object, the terminal device can drive the driving part to drive other parts of the target object to dance, to generate the animation. In an embodiment, a driving animation and a follow-up animation may be stored in the terminal device. The driving animation may be understood as a preset animation of the driving part, and the follow-up animation may be understood as a preset animation of other parts of the target object. In the embodiment of the present disclosure, the terminal device can drive the driving part, so that the driving part dances according to the driving animation, and at the same time drives other parts of the target object to dance according to the follow-up animation, to obtain the animation of the target object dancing.

The terminal device may use a preset driving animation to drive the driving part so that the driving part dances according to the driving animation. Because there are bone connections between the driving part and other parts of the target object, after the algorithm of binding the human skeleton and adding weights to the terminal device introduced in S603, the weights of the linkages between the driving part and the bones of other parts of the target object can be obtained. Then, when the terminal device drives the driving part to dance, other parts of the target object can dance along with the driving part based on the weights, so that other parts of the target object can dance according to the follow-up animation.

In an embodiment, the driving part dances according to the driving animation, which can be understood as that a dancing rhythm and dancing manner of the driving part can be the same as those in the driving animation. Similarly, other parts of the target object dance according to the follow-up animation, which can be understood as that the dancing rhythm and dancing manner of other parts of the target object may be the same as those in the follow-up animation.

It should be understood that the driving animation and the follow-up animation may be: a 2D or 3D object dancing animation, or an augmented reality (Augmented Reality, AR) animation. Correspondingly, the dancing animation of the driving part and other parts may be: an animation of a planar target object dancing, or an animation of a three-dimensional target object dancing, or an augmented reality AR animation of the target object dancing.

S605, perform blurring processing on the target object in the image.

In an embodiment, after acquiring the animation of the target object dancing, the terminal device may superimpose the animation of the target object dancing on the image. Since there is a target object on the image, if the target object is not processed, and the animation of the target object dancing is directly superimposed on the image, the target object can be seen on the image, and can also be seen in the animation, which cannot reflect realistic dancing of the target object in the image as shown in FIG. 4 above.

In order to reflect the realistic dancing effect of the target object in the image, in the embodiment of the present disclosure, the terminal device can perform blurring processing on the target object in the image, and the user can see the effect of the target object dancing in the animation, so that when seeing the dancing effect animation, the user sees that the target object in the image is realistically dancing, which makes the user have an in-depth experience and increases playfulness.

In an embodiment, the terminal device may segment out a pixel block region corresponding to the target object in the image, for example, the terminal device may segment out the pixel block region corresponding to the target object based on the image segmentation algorithm. In the embodiment of the present disclosure, the terminal device may acquire a circumscribed pentagon of the pixel block region, and then perform blurring processing on the pixel block within the pentagon. It should be understood that the circumscribed pentagon of the pixel block region is an example, and the terminal device may also acquire a circumscribed M-side polygon of the pixel block region, where M is greater than or equal to 3. It should be understood that the larger M is, the more accurate the pixel block region of the target object is.

In the embodiment of the present disclosure, the terminal device performs blurring processing on the pixel block in the pentagon, which can be understood as that the terminal device performs blurring processing on the pixel block region of the target object in the image, that is, performs blurring processing on the target object. Illustratively, the terminal device may perform blurring processing on the target object by using Gaussian blurring.

S606, superimpose the animation on a pixel block region corresponding to the blurred target object to obtain a dancing effect animation.

In order to enable the user to experience the realistic dancing effect of the target object in the image, in the embodiment of the present disclosure, the terminal device may superimpose the animation of the target object dancing on the pixel block region corresponding to the blurred target object, so that the effect that the user sees is that the target object in the image is realistically dancing. In an embodiment, the terminal device can superimpose the animation on any position of the image.

In the embodiment of the present disclosure, since the image is a frame of image in the video, the terminal device can superimpose the animation on the image and the image (s) after the image in the video to obtain the dancing effect animation. Illustratively, if the image is the first frame of image in the video, the terminal device can superimpose the animation of the target object dancing on the first frame image and other images after the first frame of image, to obtain the dancing effect animation.

In an embodiment, the region corresponding to the target object in the image is determined as a first region, the terminal device may superimpose the animation of the target object dancing on the first region of the image and the first region in the images after the image. In this way, the user can see the dancing effect animation in the same region, which is the first region.

In an embodiment, the region corresponding to the target object in the video can be changed. The region corresponding to the target object in the image is determined as the first region, and a region corresponding to the target object in an image of frame after the image is determined as a second region. In an embodiment, in order to improve the rendering effect and user experience, the terminal device may superimpose the animation of the target object dancing on the first region of the image and the second region in the image after the image. In this way, the user can see the dancing effect animation moving based on the movement of the target object in the video.

S607, display the dancing effect animation.

As shown in c3 in FIG. 7, the terminal device may display the dancing effect animation at the end of the countdown. In an embodiment, the terminal device can detect the target object in the video image at the end of the countdown, then perform steps S603-S607 based on the posture of the target object detected, and display the dancing effect animation at the end of the countdown.

In an embodiment, if the terminal device does not detect the target object at the end of the countdown, the terminal device may continue to detect the target object in the video, and then perform the above steps S602-S607 based on the posture of the target object detected, to display the dancing effect animation at the end of the countdown.

In an embodiment, after the terminal device displays the dancing effect animation, the terminal device may continue to detect the posture of the target object. When detecting a change in the posture of the target object, the terminal device may perform the above steps S603-S607 based on the detected posture of the target object, to update the dancing effect animation, so as to achieve the purpose of generating, by the terminal device, the dancing effect animation based on different postures of the target object, and increase playfulness.

In an embodiment, after the terminal device displays the dancing effect animation, the terminal device can automatically detect the target object in the video at preset intervals, and perform the above steps S603-S607 based on the detected posture of the target object, to update the dancing effect animation and increase playfulness.

In an embodiment, the user can also click the capturing preview frame 202 shown in c3 in FIG. 7 to trigger the terminal device to re-detect the target object in the video, and perform the above steps S603-S607 based on the detected posture of the target object, to update the dancing effect animation.

The above examples are examples of updating the dancing effect animation by the terminal device in the embodiment of the present disclosure. The manner of triggering the terminal device to re-detect the target object in the video and update the dancing effect animation is not limited in the embodiment of the present disclosure.

In the embodiment of the present disclosure, the terminal device can detect the target object in the image of the video, to perform dancing rendering effect on the target object, generate an animation of the target object dancing, and then superimpose the animation of the target object dancing in the video to obtain the dancing effect animation, so as to display the dancing effect animation in the video to increase playfulness. In addition, before superimposing the animation on the image, the terminal device can also perform blurring processing on the target object, so that the user can experience an effect of the target object being realistically dancing in the video, which improves the user experience.

Figure 8:
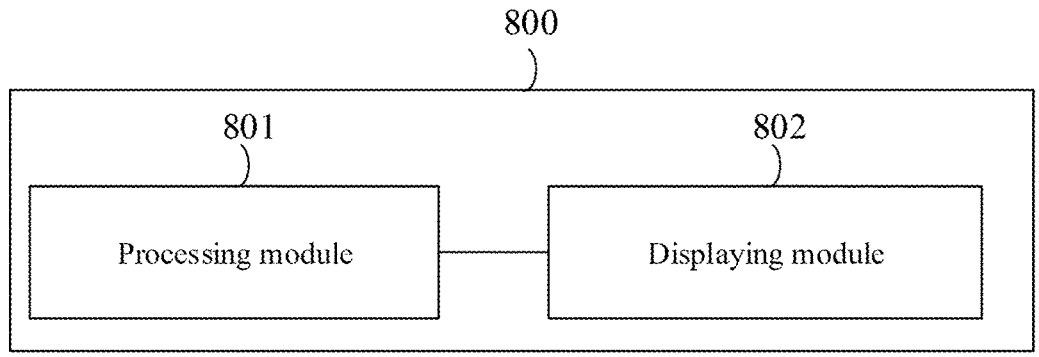
FIG. 8 is a structural block diagram of an image processing apparatus according to an embodiment of the present disclosure.

Referring to FIG. 8, FIG. 8 is a structural block diagram of an image processing apparatus according to an embodiment of the present disclosure. For convenience of description, only the parts related to the embodiments of the present disclosure are shown. Referring to FIG. 8, an image processing apparatus 800 includes: a processing module 801 and a displaying module 802.

The processing module 801 is configured to acquire an image; detect a target object in the image; perform, based on a posture of the target object, dancing effect rendering on the target object, and generate an animation of the target object dancing; and superimpose the animation on the image to obtain a dancing effect animation.

The displaying module 802 is configured to display the dancing effect animation.

In a possible implementation, the processing module 801 is specifically configured to detect a candidate object in the image; and determine the target object from the candidate object.

In a possible implementation, the image includes at least two candidate objects. The processing module 801 is specifically configured to determine the at least two candidate objects as the target object; or acquire a candidate target object from the at least two candidate objects, and determine the candidate target object as the target object.

In a possible implementation, the processing module 801 is specifically configured to acquire an area ratio of each candidate object of the at least two candidate objects; and determine the candidate object with a largest area ratio as the candidate target object.

In a possible implementation, the processing module 801 is specifically configured to determine a candidate object at a preset position as the candidate target object.

In a possible implementation, the processing module 801 is specifically configured to determine a driving part of the target object based on the posture of the target object; and drive the driving part to drive other parts of the target object to dance, to generate the animation.

In a possible implementation, the processing module 801 is further configured to perform blurring processing on the target object in the image; and superimpose the animation on a pixel block region corresponding to the target object that has been subjected to the blurring processing.

In a possible implementation, the processing module 801 is specifically configured to segment out the pixel block region corresponding to the target object in the image; acquire a circumscribed polygon of the pixel block region; and perform blurring processing on a pixel block within the polygon.

In a possible implementation, the image is a frame of image in a video. The processing module 801 is specifically configured to superimpose the animation on the image and an image in the video after the image.

In a possible implementation, the processing module 801 is specifically configured to superimpose the animation on a region corresponding to the target object in the image and a region corresponding to the target object in an image after the image.

In a possible implementation, the processing module 801 is further configured to display an identification on the image, where the identification is used to mark the target object.

In a possible implementation, the processing module 801 is specifically configured to highlight a contour line of the target object in the image.

In a possible implementation, the processing module 801 is further configured to display a countdown in the video, where the countdown is used to prompt that the dancing effect rendering is performed on the target object at the end of the countdown.

In a possible implementation manner, the processing module 801 is specifically configured to, perform, based on the posture of the target object detected, dancing effect rendering on the target object at the end of the countdown.

In a possible implementation, the processing module 801 is further configured to, if the target object is not detected at the end of the countdown, continue to detect the target object in the video.

In a possible implementation, the animation includes: an animation of a planar target object dancing, or an animation of a three-dimensional target object dancing, or an augmented reality AR animation of the target object dancing.

The image processing apparatus provided in the embodiment of the present disclosure can be used to implement the technical solutions of the above method embodiments, and the implementation principles and technical effects thereof are similar, which will not be repeated here in the embodiment.

In order to realize the foregoing embodiments, an embodiment of the present disclosure further provides an electronic device.

Figure 9:
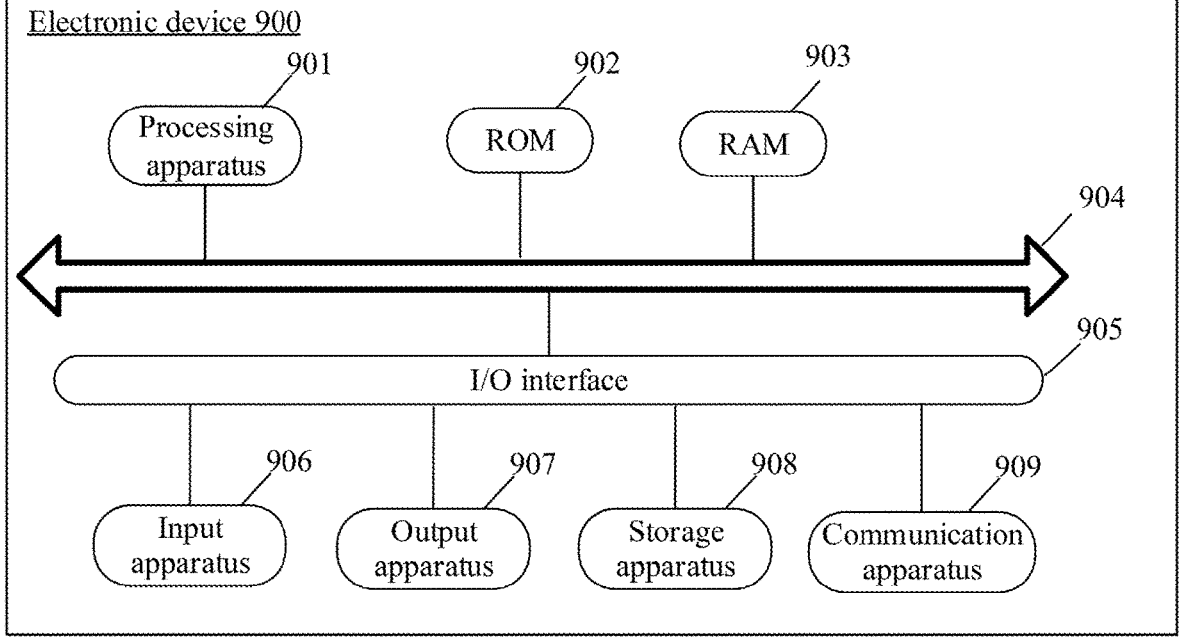
FIG. 9 is a schematic structural diagram of an electronic device according to an embodiment of the present disclosure.

Refer to FIG. 9, which shows a structural diagram of an electronic device 900 adaptable to implementing the embodiments of the present disclosure. The electronic device 900 may be a terminal device. The terminal device may include, but is not limited to, a mobile terminal, such as a mobile phone, a notebook computer, a digital broadcast receiver, a personal digital assistant (PDA), a portable android device (PAD), a portable media player (PMP), an on-vehicle terminal (for example, a vehicle navigation terminal), a wearable electronic device, and a fixed terminal, such as, a digital TV, a desktop computer, a smart home device. The electronic device shown in FIG. 9 is only an example, and should not bring any limitation to the function and scope of use for the embodiments of the present disclosure.

As shown in FIG. 9, the electronic device 900 may include a processing apparatus 901 (such as a central processing unit, a graphics processor, etc.), which may execute suitable actions and processing according to programs stored in a read-only memory (ROM) 902 or programs loaded into a random access memory (RAM) 903 from a storage apparatus 908. In the RAM 903, various programs and data required for the operation of the electronic device 900 are also stored. The processing apparatus 901, the ROM 908, and the RAM 903 are connected to each other through a bus 904. An input/output (I/O) interface 905 is also connected to the bus 904.

Generally, the following apparatuses can be connected to the I/O interface 905: an input apparatus 906, including, for example, a touch screen, a touch pad, a keyboard, a mouse, a camera, a microphone, an accelerometer, a gyroscope, etc.; an output apparatus 907, including, for example, a liquid crystal display (LCD), a speaker, a vibrator, etc.; a storage apparatus 908, including, for example, a magnetic tape, a hard disk, etc.; and a communication apparatus 909. The communication apparatus 909 allow the electronic device 900 to perform wireless or wired communication with other devices to exchange data. Although FIG. 9 shows the electronic device 900 with multiple kinds of apparatuses, it is not required to implement or have all the apparatuses shown in FIG. 9. It may alternatively be implemented or provided with more or fewer apparatuses.

In particular, according to an embodiment of the present disclosure, the process described above with reference to the flowchart may be implemented as a computer software program. For example, an embodiment of the present disclosure includes a computer program product, which includes a computer program carried on a computer-readable medium, and the computer program contains program codes for executing the method shown in the flowchart. In such an embodiment, the computer program may be downloaded and installed from the network through the communication apparatus 909, or installed from the storage apparatus 908, or installed from the ROM 902. When the computer program is executed by the processing apparatus 901, the above-mentioned functions defined in the method of the embodiment of the present disclosure are executed.

It should be noted that the above-mentioned computer-readable medium in the present disclosure may be a computer-readable signal medium or a computer-readable storage medium, or any combination thereof. The computer-readable storage medium may be, for example, but not limited to, an electrical, a magnetic, an optical, an electro-magnetic, an infrared, or a semiconductor system, apparatus, or device, or any combination thereof. More specific examples of the computer readable storage medium may include, but are not limited to: an electrical connection with one or more wires, a portable computer disk, a hard disk, a random access memory (RAM), a read only memory (ROM), an erasable programmable read-only memory (EPROM or flash memory), an optical fiber, a compact disc read-only memory (CD-ROM), an optical storage device, a magnetic storage device, or any suitable combination of the above. In the present disclosure, a computer-readable storage medium may be any tangible medium that includes or stores programs, and the programs may be used by or in combination with an instruction execution system, apparatus, or device. In the present disclosure, a computer-readable signal medium may include a data signal propagated in a baseband or as a part of a carrier wave with computer-readable program codes carried therein. This propagated data signal can take many forms, including but not limited to electromagnetic signal, optical signal, or any suitable combination thereof. The computer readable signal medium may also be any computer readable medium other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, a radio frequency (RF), etc., or any suitable combination of the above.

The above-mentioned computer-readable medium may be included in the above-mentioned electronic device; or it may exist alone without being assembled into the electronic device.

The above computer-readable medium carries one or more programs, and when the foregoing one or more programs are executed by the electronic device, the electronic device is caused to execute the method shown in the foregoing embodiment.

The computer program code used to perform the operations of the present disclosure can be written in one or more programming languages or a combination thereof. The above-mentioned programming languages include object-oriented programming languages-such as Java, Smalltalk, C++, and also include conventional procedural programming language-such as "C" language or similar programming language. The program code may be executed entirely on a user computer, partly on a user computer, executed as an independent software package, partly executed on a user computer and partly executed on a remote computer, or entirely executed on a remote computer or server. In the case of a remote computer, the remote computer can be connected to a user computer through any kind of network, including a local area network (LAN) or a wide area network (WAN), or it can be connected to an external computer (for example, connected via an Internet connection using an Internet service provider).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that each block in the block diagram and/or flowchart, and the combination of the blocks in the block diagram and/or flowchart, may be implemented by a dedicated hardware-based system that performs the specified functions or operations, or it can be implemented by a combination of dedicated hardware and computer instructions.

The units involved in the embodiments described in the present disclosure may be implemented in software or hardware. Where a name of a unit does not constitute a limitation on the unit itself in one case. For example, a first acquiring unit may also be described as "a unit that acquires at least two Internet Protocol addresses".

The functions described herein above may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium, which may contain or store a program for use by or in combination with an instruction execution system, apparatus or device. The machine readable medium may be a machine readable signal medium or a machine readable storage medium. The machine-readable medium may include, but is not limited to, an electronic, a magnetic, an optical, an electromagnetic, an infrared, or a semiconductor system, apparatus, or device, or any suitable combination thereof. More specific examples of the machine-readable storage media may include an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In a first aspect, according to one or more embodiments of the present disclosure, an image processing method is provided, including: acquiring an image; detecting a target object in the image; performing, based on a posture of the target object, dancing effect rendering on the target object to generate an animation of the target object dancing; superimposing the animation on the image to obtain a dancing effect animation; and displaying the dancing effect animation.

According to one or more embodiments of the present disclosure, the detecting the target object in the image includes: detecting a candidate object in the image; and determining the target object from the candidate object.

According to one or more embodiments of the present disclosure, the image includes at least two candidate objects, and the determining the target object from the candidate object includes: determining the at least two candidate objects as the target object; or acquiring a candidate target object from the at least two candidate objects, and determining the candidate target object as the target object.

According to one or more embodiments of the present disclosure, the acquiring the candidate target object from the at least two candidate objects includes: acquiring an area ratio of each candidate object of the at least two candidate objects; and determining the candidate object with a largest area ratio as the candidate target object.

According to one or more embodiments of the present disclosure, the acquiring the candidate target object from the at least two candidate objects includes: determining a candidate object at a preset position as the candidate target object.

According to one or more embodiments of the present disclosure, the performing, based on the posture of the target object, dancing effect rendering on the target object to generate the animation of the target object dancing includes: determining a driving part of the target object based on the posture of the target object; and driving the driving part to drive other parts of the target object to dance, to generate the animation.

According to one or more embodiments of the present disclosure, before superimposing the animation on the image, the method includes: performing blurring processing on the target object in the image; and the superimposing the animation on the image includes: superimposing the animation on a pixel block region corresponding to the target object that has been subjected to the blurring processing.

According to one or more embodiments of the present disclosure, the performing blurring processing on the target object in the image includes: segmenting out the pixel block region corresponding to the target object in the image; acquiring a circumscribed polygon of the pixel block region; and performing blurring processing on a pixel block within the polygon.

According to one or more embodiments of the present disclosure, the image is a frame of image in a video, and the superimposing the animation on the image includes: superimposing the animation on the image and an image in the video after the image.

According to one or more embodiments of the present disclosure, the superimposing the animation on the image and the image in the video after the image includes: superimposing the animation on a region corresponding to the target object in the image and a region corresponding to the target object in the image after the image.

According to one or more embodiments of the present disclosure, after detecting the target object in the image, the method further includes: displaying an identification on the image, where the identification is used to mark the target object.

According to one or more embodiments of the present disclosure, the displaying the identification on the image includes: highlighting a contour line of the target object in the image.

According to one or more embodiments of the present disclosure, after displaying the identification on the image, the method further includes: displaying a countdown in the video, where the countdown is used to prompt that the dancing effect rendering is performed on the image at the end of the countdown.

According to one or more embodiments of the present disclosure, the performing, based on the posture of the target object, dancing effect rendering on the target object includes: performing, based on the posture of the target object detected, dancing effect rendering on the target object at the end of the countdown.

According to one or more embodiments of the present disclosure, the method further includes: if the target object is not detected at the end of the countdown, continuing to detect the target object in the video.

According to one or more embodiments of the present disclosure, the animation includes: an animation of a planar target object dancing, or an animation of a three-dimensional target object dancing, or an augmented reality AR animation of the target object dancing.

In a second aspect, according to one or more embodiments of the present disclosure, an image processing apparatus is provided, including: a processing module, configured to acquire an image; detect a target object in the image; perform, based on a posture of the target object, dancing effect rendering on the target object to generate an animation of the target object dancing; and superimpose the animation on the image to obtain a dancing effect animation; and a displaying module, configured to display the dancing effect animation.

According to one or more embodiments of the present disclosure, the processing module is specifically configured to detect a candidate object in the image; and determine the target object from the candidate object.

According to one or more embodiments of the present disclosure, the image includes at least two candidate objects. The processing module is specifically configured to determine the at least two candidate objects as the target object; or acquire a candidate target object from the at least two candidate objects, and determine the candidate target object as the target object.

According to one or more embodiments of the present disclosure, the processing module is specifically configured to acquire an area ratio of each candidate object of the at least two candidate objects; and determine the candidate object with a largest area ratio as the candidate target object.

According to one or more embodiments of the present disclosure, the processing module is specifically configured to determine a candidate object at a preset position as the candidate target object.

According to one or more embodiments of the present disclosure, the processing module is specifically configured to determine a driving part of the target object based on the posture of the target object; and drive the driving part to drive other parts of the target object to dance, to generate the animation.

According to one or more embodiments of the present disclosure, the processing module is further configured to perform blurring processing on the target object in the image; and superimpose the animation on a pixel block region corresponding to the target object that has been subjected to the blurring processing.

According to one or more embodiments of the present disclosure, the processing module is specifically configured to segment out the pixel block region corresponding to the target object in the image; acquire a circumscribed polygon of the pixel block region; and perform blurring processing on a pixel block within the polygon.

According to one or more embodiments of the present disclosure, the image is a frame of image in a video. The processing module is specifically configured to superimpose the animation on the image and an image in the video after the image.

According to one or more embodiments of the present disclosure, the processing module is specifically configured to superimpose the animation on a region corresponding to the target object in the image and a region corresponding to the target object in the image after the image.

According to one or more embodiments of the present disclosure, the processing module is further configured to display an identification on the image, where the identification is used to mark the target object.

According to one or more embodiments of the present disclosure, the processing module is specifically configured to highlight a contour line of the target object in the image.

According to one or more embodiments of the present disclosure, the processing module is further configured to display a countdown in the video, where the countdown is used to prompt that the dancing effect rendering is performed on the image at the end of the countdown.

According to one or more embodiments of the present disclosure, the processing module is specifically configured to perform, based on the posture of the target object detected, dancing effect rendering on the target object at the end of the countdown.

According to one or more embodiments of the present disclosure, the processing module 801 is further configured to, if the target object is not detected at the end of the countdown, continue to detect the target object in the video.

According to one or more embodiments of the present disclosure, the animation includes: an animation of a planar target object dancing, or an animation of a three-dimensional target object dancing, or an augmented reality AR animation of the target object dancing.

In a third aspect, according to one or more embodiments of the present disclosure, an electronic device is provided, including: a processor and a memory; where the memory stores computer-executable instructions; the processor executes the computer-executable instructions stored in the memory, to cause the processor to execute the image processing method described in the first aspect above and various possible designs of the first aspect.

In a fourth aspect, according to one or more embodiments of the present disclosure, a computer-readable storage medium is provided. The computer-readable storage medium has computer-executable instructions stored thereon, and when a processor executes the computer-executable instructions, the image processing method according to the above first aspect and any possible designs of the first aspect is implemented.

In the fifth aspect, an embodiment of the present disclosure provides a computer program product, including a computer program or instructions, where when the computer program or the instructions are executed by a processor, the image processing method according to the above first aspect and any possible designs of the first aspect is implemented.

In a sixth aspect, an embodiment of the present disclosure provides a computer program, where when the computer program is executed by a processor, the image processing method according to the above first aspect and any possible designs of the first aspect is implemented.

The above description is only preferred embodiments of the present disclosure and an explanation of the applied technical principles. Those skilled in the art should understand that the scope of disclosure involved in the present disclosure is not limited to the technical solutions formed by the specific combinations of the above technical features, and should also cover other technical solutions formed by any combination of the above technical features or equivalent features without departing from the above disclosed concept. For example, the above-mentioned features and the technical features disclosed in the present disclosure (but not limited to) having similar functions are replaced with each other to form a technical solution.

In addition, although various operations are described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features that are described in the context of separate embodiments may also be implemented in combination in a single embodiment. On the contrary, various features described in the context of a single embodiment may also be implemented in multiple embodiments individually or in any suitable subcombination.

Although the subject matter has been described in language specific to a structural feature and/or a logical action of the method, it should be understood that the subject matter defined in the appended claims is not necessarily limited to the specific features or actions described above. On the contrary, the specific features and actions described above are only exemplary forms for implementing the claims.

What is claimed is:

1. An image processing method, comprising:
   acquiring an image;
   detecting a target object in the image;
   performing, based on a posture of the target object, dancing effect rendering on the target object to generate an animation of the target object dancing;
   superimposing the animation on the image to obtain a dancing effect animation; and
   displaying the dancing effect animation;
   wherein the performing, based on the posture of the target object, the dancing effect rendering on the target object to generate the animation of the target object dancing comprises:
      determining a driving part of the target object based on the posture of the target object; and
      driving the driving part to drive other parts of the target object to dance, to generate the animation;
      wherein the driving part comprises a part with a smallest ordinate among pixel blocks of the target object.

2. The method according to claim 1, wherein the detecting the target object in the image comprises:
   detecting a candidate object in the image; and
   determining the target object from the candidate object.

3. The method according to claim 2, wherein the image includes at least two candidate objects, and the determining the target object from the candidate object comprises:
   determining the at least two candidate objects as the target object; or,
   acquiring a candidate target object from the at least two candidate objects, and determining the candidate target object as the target object.

4. The method according to claim 3, wherein the acquiring the candidate target object from the at least two candidate objects comprises:

acquiring an area ratio of each candidate object of the at least two candidate objects; and determining the candidate object with a largest area ratio as the candidate target object.

5. The method according to claim 3, wherein the acquiring the candidate target object from the at least two candidate objects comprises:

determining a candidate object at a preset position as the candidate target object.

6. The method according to claim 1, wherein before superimposing the animation on the image, the method comprises:

performing blurring processing on the target object in the image;

the superimposing the animation on the image comprises:

superimposing the animation on a pixel block region corresponding to the target object that has been subjected to the blurring processing.

7. The method according to claim 6, wherein the performing blurring processing on the target object in the image comprises:

segmenting out the pixel block region corresponding to the target object in the image;

acquiring a circumscribed polygon of the pixel block region; and performing blurring processing on a pixel block within the polygon.

8. The method according to claim 1, wherein the image is a frame of image in a video, and the superimposing the animation on the image comprises:

superimposing the animation on the frame of image and another frame of image in the video after the frame of image.

9. The method according to claim 8, wherein the superimposing the animation on the frame of image and the another frame of image in the video after the frame of image comprises:

superimposing the animation on a region corresponding to the target object in the frame of image and a region corresponding to the target object in the another frame of image after the frame of image.

10. The method according to claim 8, wherein after the detecting the target object in the image, the method further comprises:

displaying an identification on the image, wherein the identification is used to mark the target object.

11. The method according to claim 10, wherein the displaying the identification on the image comprises:

highlighting a contour line of the target object in the image.

12. The method according to claim 10, wherein after the displaying the identification on the image, the method further comprises:

displaying a countdown in the video, wherein the countdown is used to prompt that the dancing effect rendering is performed on the target object at the end of the countdown.

13. The method according to claim 12, wherein the performing, based on the posture of the target object, the dancing effect rendering on the target object comprises:

performing, based on a posture of the target object detected, the dancing effect rendering on the target object at the end of the countdown.

14. The method according to claim 12, further comprising:

in a case that the target object is not detected at the end of the countdown, continuing to detect the target object in the video.

15. The method according to claim 1, wherein the animation comprises: an animation of a planar target object dancing, or an animation of a three-dimensional target object dancing, or an augmented reality AR animation of the target object dancing.

16. An image processing apparatus, comprising:

at least one processor; and memory communicatively connected to the at least one processor; wherein, the memory stores instructions executable by the at least one processor and the instructions are executed by the at least one processor, so that the at least one processor is configured to:

acquire an image;

detect a target object in the image;

perform, based on a posture of the target object, dancing effect rendering on the target object to generate an animation of the target object dancing;

superimpose the animation on the image to obtain a dancing effect animation; and display the dancing effect animation;

wherein the at least one processor is further configured to:

determine a driving part of the target object based on the posture of the target object; and drive the driving part to drive other parts of the target object to dance, to generate the animation;

wherein the driving part comprises a part with a smallest ordinate among pixel blocks of the target object.

17. The image processing apparatus according to claim 16, wherein the at least one processor is configured to:

detect a candidate object in the image; and determine the target object from the candidate object.

18. The image processing apparatus according to claim 16, wherein the image includes at least two candidate objects, and the at least one processor is configured to:

determine the at least two candidate objects as the target object; or, acquire a candidate target object from the at least two candidate objects, and determine the candidate target object as the target object.

19. A non-transitory computer-readable storage medium, wherein the computer-readable storage medium has computer-executable instructions stored thereon, and when a processor executes the computer-executable instructions, the processor executes steps of:

acquiring an image;

detecting a target object in the image;

performing, based on a posture of the target object, dancing effect rendering on the target object to generate an animation of the target object dancing;

superimposing the animation on the image to obtain a dancing effect animation; and displaying the dancing effect animation;

wherein the performing, based on the posture of the target object, dancing effect rendering on the target object to generate the animation of the target object dancing comprises:

determining a driving part of the target object based on the posture of the target object; and driving the driving part to drive other parts of the target object to dance, to generate the animation;

wherein the driving part comprises a part with a smallest ordinate among pixel blocks of the target object.

\* \* \* \* \*